United States Patent [19]

Filss

[11] 4,036,597
[45] July 19, 1977

[54] APPARATUS FOR PURIFYING GASES

[75] Inventor: Peter Filss, Julich, Germany

[73] Assignee: Kernforschungsanlage Julich Gesellschaft mit beschrankter Haftung, Julich, Germany

[21] Appl. No.: 579,372

[22] Filed: May 21, 1975

Related U.S. Application Data

[62] Division of Ser. No. 380,619, July 19, 1973, Pat. No. 3,907,967.

[30] Foreign Application Priority Data

July 25, 1972 Germany .............................. 2236389

[51] Int. Cl.² .......................................... B01J 10/00
[52] U.S. Cl. ......................................... 23/284; 55/71; 55/73; 55/232; 55/234; 55/292; 159/11 B; 261/92; 261/154
[58] Field of Search ...................... 55/90, 91, 228, 71, 55/73, 230–232, 234, 292; 23/284; 261/91, 92, 84, 153, 154, 156; 159/11 B

[56] References Cited

U.S. PATENT DOCUMENTS

| 1,253,401 | 1/1918 | Lorimer | 261/92 |
| 3,211,148 | 10/1965 | Galajda, Jr. | 261/92 |
| 3,348,829 | 10/1967 | Grimes | 261/92 |
| 3,353,337 | 11/1967 | Gale | 55/232 |
| 3,528,781 | 9/1970 | Gelfman et al. | 55/230 |
| 3,687,613 | 8/1972 | Rickard | 55/73 |
| 3,710,548 | 1/1973 | Coughlin | 423/244 |
| 3,907,967 | 9/1975 | Filss | 55/68 |

Primary Examiner—Bernard Nozick
Attorney, Agent, or Firm—Walter Becker

[57] ABSTRACT

A method of and apparatus for purifying gases, especially industrial waste gases, according to which a solid surface layer adapted to adsorb impurifications is formed on rotatable discs of which successive portions during the rotation of the discs temporarily protrude from a liquid containing container. This layer, when being contacted by the gas to be purified, adsorbs the impurifications and harmful substances of the gas. The exhausted portion of the surface layer is replaced successively by a new surface layer portion formed by wetting the disc portions when the latter pass through the liquid in the container.

9 Claims, 3 Drawing Figures

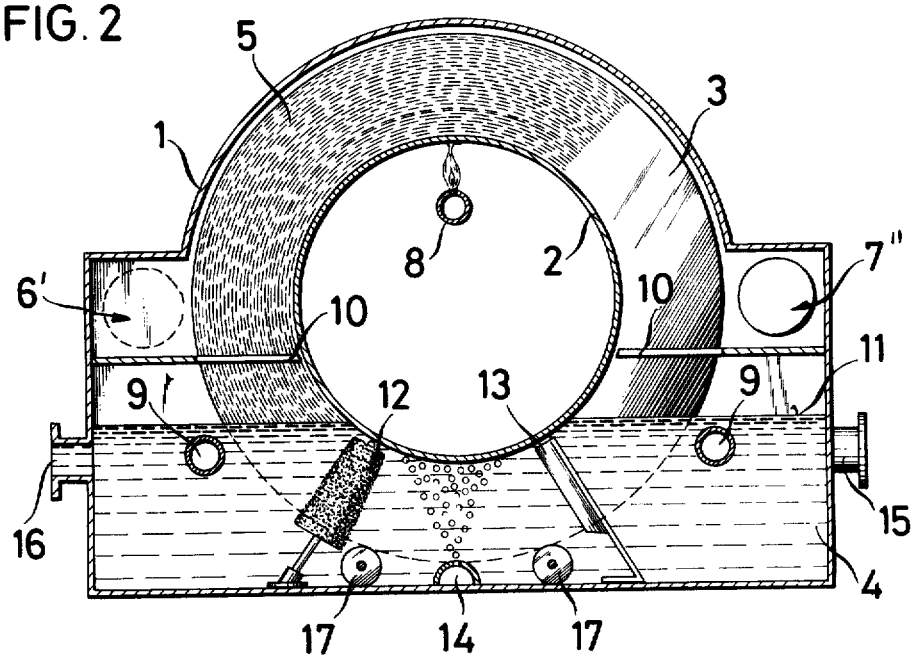
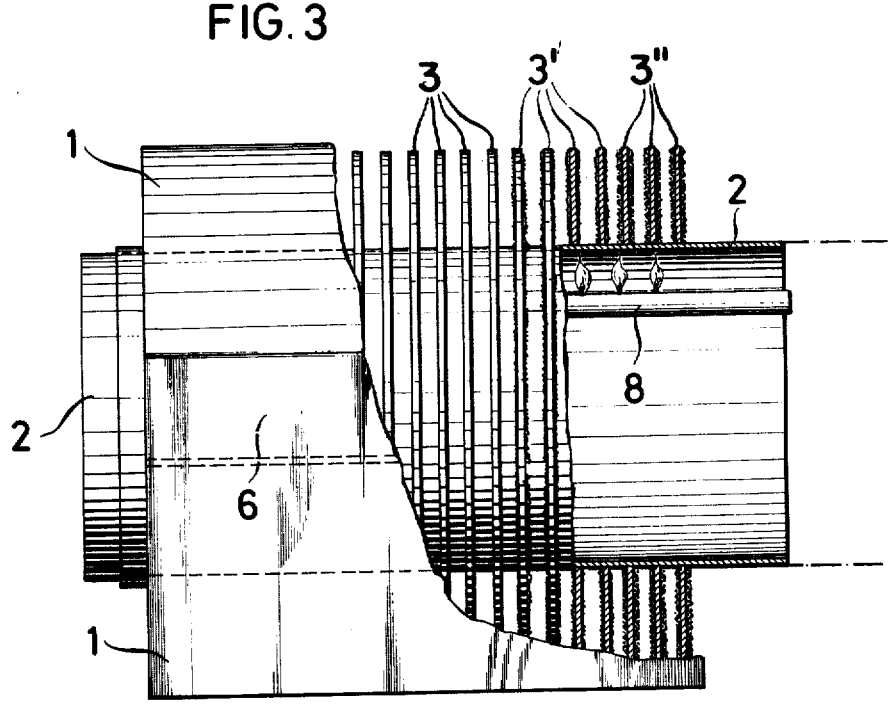

APPARATUS FOR PURIFYING GASES

This is a division of co-pending application Ser. No. 380,619—Peter Filss filed July 19, 1973, now U.S. Pat. No. 3,907,967—Filss issued Sept. 23, 1975.

The present invention relates to a method for purifying gases, especially industrial waste gases, according to which the gases are passed between plates above the liquid level, which plates rotate about an axis and immerse in a liquid by which they are wetted, the plates being spaced from each other by a distance of a few millimeters. The particles forming the impurifications are adsorbed by the wetted surface. The present invention also concerns a device for practicing this method.

A purification of industrial waste gases prior to their emission into the atmosphere is necessary because such waste gases generally contain various impurifications and harmful substances. For separating the impurifications from the waste gases, numerous methods and devices have become known. The steps employed in this connection depend on the respective chemical properties and the degree of dispersion of the impurities to be separated. As far as the separation of molecular-disperse harmful substances and impurifications of gases are involved, in particular wet purification methods have been employed so far. In this connection, the gases to be purified are cooled and moistened. This has the drawback that additional steps are necessary to impart upon the gases the buoyancy necessary for their emission into the atmosphere. Another drawback consists in the fact that the gases are charged with moisture and aerosols as it generally occurs when liquid washers are employed for the wet treatment which affects the environment in an undesirable manner. It is furthermore known to free carbon dioxide containing gases from volatile iron compounds by passing the gases at an increased temperature over suitable solid materials, such as lime, barium oxide, or the like. This method is applicable only for the just mentioned purpose and has the drawback that the regeneration of the employed adsorbing material has to be effected in a discontinuous manner.

The prior art furthermore comprises methods for precipitating useful substances or other admixtures from flue gases, according to which the gases are passed along discs which partly immerse in water or a chemical liquid and which rotate at such low speed that they will remain continuously wetted with liquid. With this method, the particles suspended in the gases are to adhere to the discs. This method, however, has the drawback that it remained limited to the employment of liquid adsorbing means.

It is, therefore, an object of the present invention to provide a method and device which will make it possible safely to separate impurifications and harmful substances from gases, especially industrial waste gases, by binding such impurifications and harmful substances by reaction and adsorption to solid material-surface layers while it will be assured that the separation can be carried out by a continuous regeneration of the solid material-surface layer without interruption.

These and other objects and advantages of the invention will appear more clearly from the following specification in connection with the accompanying drawings, in which:

FIG. 2 shows a front view of the device of FIG. 1, but with additional auxiliary devices.

FIG. 3 is a side view of the device of FIG. 1, partly shown in section.

Figure 1:
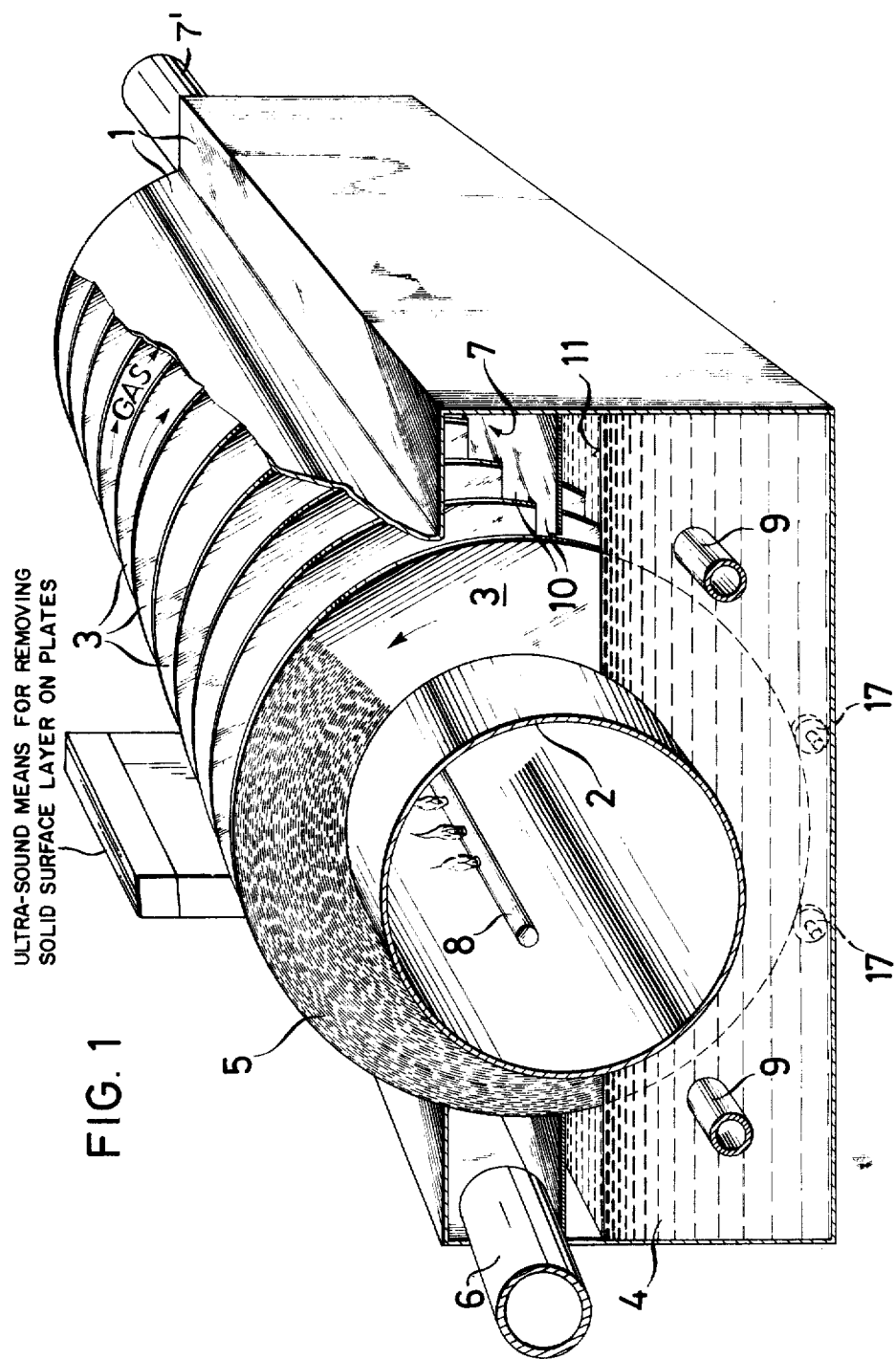
FIG. 1 is a perspective illustration of a device according to the invention.

The method according to the present invention is characterized in that on the respective portion of the plates which is located above the liquid level there is formed a solid surface layer which absorbs the impurifications and, as the case may be, reacts therewith. The method according to the present invention is furthermore characterized in that in the liquid consisting of the aqueous solution of the surface layer to be formed the adsorbed impurifications and harmful substances and, as the case may be, the substances formed during the reaction of these substances with the surface layer are removed, and the plates are again wetted. The impurifications and harmful substances contained in the gases are when contacting the surface layer formed on the discs bound to this surface layer, while the surface layer, due to the adsorption or reaction with the particles contained in the gases, is being transformed and exhausted. The exhausted layer can in the liquid normally be easily removed, but in difficult instances it can be removed by means of brushes, scrapers, and the like. Subsequently the plates are wetted with a fresh solution. From the thus created liquid film, a new solid surface layer will form due to drying. For forming the surface layer, expediently water soluble compounds are selected which bind the substances contained in the gases to the solid surface layer formed on the plates by wetting. Thus, the liquid must be such that also the substances formed during the reaction of the impurifications and harmful substances with the surface layer can be removed. In this way it will be assured that on the plates, following a further rotation through the liquid bath, the new film and the surface layer suited for the adsorption and, as the case may be, for the intended reaction will be formed.

As far as necessary, the plates are heated or cooled fully or partly. This will bring about that the intended solid surface layer will quickly form after the plates emerge from the liquid. Furthermore, it will be assured that the method according to the invention is carried out at the temperature most favorable for the respective type of purification. For practicing the method according to the invention, it is advantageous that the liquid contains substances which during the evaporation or the reaction due to the adsorption of the impurifications on the surface layer will form a gel with a structure rich in pores or a frame-like structure. As a result thereof, the effective surface of the adsorbing surface layer and/or the surface layer reacting with the substances contained in the gases will be enlarged.

A very advantageous device for practicing the method according to the present invention consists in that the plates are of circular shape and are firmly coaxially arranged on a hollow tube which is adapted in any convenient manner to be heated or cooled. As a result thereof, as far as this may be expedient, the plates can be heated or cooled in a simple manner. The continuous regeneration of the exhausted surface layer is effected by slowly turning the hollow tube and the plates. The device for practicing the method according to the invention is particularly effective when the upper portion of the housing extends with slight play over that part of the plates which projects out of the liquid level. It has furthermore proved advantageous to make the diameter of the hollow tube larger than one third of the outer diameter of the plates. To make the surface of the plates as large as possible, it is expedient to roughen the surface of the plates in any known manner mechanically or by etching. Another advantageous step for forming the surface layer on the plates consists in that on the plates there are arranged felt layers comprising metal wires or thin layers of a known solid material having a large surface, or that the plates have a regular or irregular profile which enlarges the surface.

If the load exerted on the hollow tube by the plates is so great that an undesired bending of the hollow tube occurs, supporting rollers are rotatably arranged in the housing for supporting the hollow tube and the plates connected thereto.

A preferred embodiment of the device according to the invention consists in that the hollow tube projects partially beyond the liquid level and that above the liquid level on both sides of the hollow tube in the gap formed by the housing and the hollow tube there are provided comb-shaped strips which extend into the vicinity of the hollow tube and engage the spaces between the plates. These comb-shaped strips extend parallel to the longitudinal axis of the hollow tube and are connected to the inner wall of the housing. In order to realize a fast removal of the layer forming on the plates from the plates, brushes or scrapers may be arranged within the liquid bath which are in contact with the surfaces of the plates. Instead of this arrangement, it is also possible for removing the surface layer after the latter is loaded to arrange within the liquid bath an ultrasound device known per se. It is expedient that the feeding of the gas to be purified and the withdrawal of the purified gas is effected through connections which are arranged on opposite sides of the housing. In this way it will be brought about that the gas passes in radial and azimuthal direction through the spaces defined by the plates above the liquid level. If the liquid in the container is replaced and withdrawn continuously, it is expedient that with a continuous feeding-in and withdrawal of the liquid the feeding is effected at that point of the housing where the freshly wetted plates emerge from the liquid, whereas the withdrawal should be effected on the opposite side of the housing.

The method and device according to the invention are well suited for separating molecular disperse impurifications and harmful substances from air or $CO_2$-containing waste gases, such as $J_2$, and are particularly well suited for substances with typical acid character, such as HCl and $SO_2$.

Referring now to the drawings in detail, the arrangement shown therein comprises a housing 1 in which on a hollow tube 2 rotatably journalled in the housing there are arranged a plurality of plates 3 which are rotatable about the their axes and are spaced from each other by a distance of a few millimeters. Tube 2 and plates 3 form a rigid unit with each other. The lower portion of the container-shaped housing 1 is adapted to receive and contain a liquid bath 4. The plates 3 immerse into this liquid bath. To this end, housing 1 is widened in the manner of a bottom based vessel. The height of the liquid bath 4 is expediently so selected that the hollow tube 2 divides the level of the liquid bath 4 into two ranges. The liquid bath 4 is chemically so composed that the layer 5, which during the rotation of the plates 3 is formed on the plates within the region above the liquid level 11 by wetting and drying, is suitable for the adsorption of and/or, as the case may be, for the reaction with the substances which are contained in the gas to be purified and which are to be separated. As will be evident from the drawing, the upper portion of housing 1 extends with slight play around the plates 3. If the gas to be purified flows from the connection 6 arranged laterally on the housing 1 into the space above the liquid level 11, the gas will flow through the spaces between the plates 3 and will leave the housing 1 through the connectioon 7. If desired, it may be expedient, in order to realize as uniform a distribution as possible of the incoming gas when flowiing into the housing 1, to provide guiding plates in the feeding connection 6. When the gas passes through the spaces between the plates 3, the undesired components contained in the gas are adsorbed by the surface layer 5 which during the rotation of plates 3 is formed by drying of the wetting liquid. During the formation of the solid layers 5, which is effected in conformity with the method according to the invention on the surface of plates 3, the temperature of the gases to be purified which is frequently above room temperature, will be taken advantage of. If this should not suffice or if high temperatures favor the desired reaction, a heating device 8, for instance gas burners, may be provided in the hollow tube 2. Instead, also an electric or hot steam or hot air heating device may be provided. The speed of rotation of plates 3 is furthermore so selected that the plates will remain moist only in a relatively small range above the liquid level 11 and will be dried in a short time. To prevent a simultaneous heating up of the liquid bath 4, it may be expedient to provide cooling coils 9 within the bath. In order to realize both, the heating up of the plates 3 in the respective range of plates 3 above the liquid level 11 and also a cooling of the liquid bath, it is expedient to select the diameter of the hollow tube 2 relatively great in comparison to the outer diameter of the plates 3.

To prevent a strong evaporation of the liquid into the gas which flows above the hollow tube 2, comb-like strips 10 are on both sides of the hollow tube 2 and above the liquid level 11 connected to the inner wall of the housing 1 and extend parallel to the axis of the hollow tube 2. As will be evident from the drawings, the plates 3 extend between the strips 10.

The rotation of the plates 3 may be effected in a direction which is opposite to the direction of flow of the incoming gas. This is indicated by the arrows in FIG. 1. The rotary movement of plates 3 may, however, if this should be expedient, also be effected in the same direction as the direction of flow of the incoming gas.

As shown in the drawings, the plates 3' may, if necessary, for enlarging their surface, be lined with a thin layer of a material having a large surface, such as pumice or the like. Instead, the liquid bath may have added thereto a substance which during the evaporation or during the purification process forms a gel with a large surface or a frame-structure. To this end, for instance, waterglass may be used from which during a reaction with acid gases the large surface frame-structure of silicic acid is formed. Another possibility to enlarge the surface of the plates 3' consists in mechanically or by etching roughening the surface of the plates. If considered necessary, the plates 3' may entirely or partly have a corrugatd or edged profile. Plates 3" are provided with metal wire containing felt layers for enlarging the surface of the plate means. In order to make sure that the solid material adsorption layer formed on the surfaces of the plates will be very carefully and quickly washed off, there are within the liquid bath provided brushes 12 (FIG. 2) which on the inside of the liquid bath 4 are in contact with both sides of the plates. Instead thereof or in addition thereto, it is also possible at the lower portion of the housing 1 to provide a conduit 14 for gas under pressure which leads into the liquid bath 4 and by means of which the bath is agitated.

If it is expedient continuously to regenerate the liquid, the feeding line 15 for the liquid is preferably provided on that side of the housing on which the plates 3 are rotated through the liquid bath 4 to the outside, while the discharge conduit 16 is provided on that side of the housing on which the exhausted or used-up layer is removed from the plates 3. The drive and the mounting of the hollow tube 2 are arranged outside the housing 1 (not shown in the drawings).

By means of the device according to the invention as described above, in which ten plates having a diameter of 90 mm and thickness of 5 mm are arranged on a hollow tube having a diameter of 50 mm — the spacing between the plates being 5 mm —, the following gas purifications have been effected. The temperature of the liquid bath was 30° C, while the temperature between the plates amounted to 100° C. Both temperatures were measured by means of mercury thermometers. Prior to practicing the method, the entire device was each time cleaned by means of a washing solution.

EXAMPLE 1

Iodine containing air was purified by means of the device according to the invention. The device contained a 10% KI— solution as liquid bath from which the adsorption layer formed. For producing the iodine containing air, first ordinary air was at room temperature saturated with iodine steam by air flowing over iodine crystals. The partial pressure of the iodine in the added air amounted to 0.25 Torr. With the plates mounted on the hollow tube rotating at a speed of 8 rph, the following values were obtained:

| Flow velocity of the raw gas | Relative iodine content prior to the gas purification | Relative iodine content after the gas purification |
| --- | --- | --- |
| 12 l/h | 1 | 1/100 |
| 25 l/h | 1 | 1/100 |
| 50 l/h | 1 | 1/20 |
| 100 l/h | 1 | 1/4 |
| 250 l/h | 1 | 1/2 |

The relative iodine content was determined calorimetrically by discoloration of starch paper.

The uniform brown coloration of the bath liquid by $J_2$ in the region of the immersed plates indicates that the iodine adsorption and thus also the gas flow were distributed uniformly over the individual chambers of the plate packet.

EXAMPLE 2

HCl-containing air was purified by means of NaOH as bath and adsorbing substance. For producing HCl-containing air, first ordinary air was charged with HCl by flowing over a 35% hydrochloric acid; at a flow velocity of 25 l/h, the HCl partial pressure amounted to 30 Torr. The rotational speed of the plates on the hollow tube amounted to 12 rph. The following values were obtained:

| Flow velocity of the raw gas | Relative HCl content prior to the gas purification | Relative HCl content after the gas purification |
| --- | --- | --- |
| 12 l/h | 1 | 1/1500 |
| 25 l/h | 1 | 1/350 |
| 50 l/h | 1 | 1/25 |
| 100 l/h | 1 | 1/3 |

EXAMPLE 3

During the purification of HCl-containing air under the same conditions as in Example 2, but with a bath liquid of waterglass diluted with water at the ratio of 1:1 (Merck Article No. 5621), the following values were obtained:

| Flow velocity of the raw gas | Relative HCl content prior to the gas purification | Relative HCl content after the gas purification |
| --- | --- | --- |
| 12 l/h | 1 | 1/500 |
| 25 l/h | 1 | 1/500 |
| 50 l/h | 1 | 1/50 |
| 100 l/h | 1 | 1/20 |

The exhausted or used-up layer scaled off from the plates in the manner of fish scales.

EXAMPLE 4

$SO_2$-containing air was purified by means of a liquid bath which contained 100 g of NaOH per 1 liter of the bath. The $SO_2$-containing air had previously been prepared by passing air through a piston in which a diluted sulfuric acid dripped onto sodium sulfite. At a flow velocity of 50 l/h, the partial pressure of the $SO_2$ amounted to 6 Torr. At a speed of rotation of 12 rph, the following values were obtained:

| Flow velocity of the raw gas | Relative $SO_2$ content prior to the gas purification | Relative $SO_2$ content after the gas purification |
| --- | --- | --- |
| 50 l/h | 1 | 1/200 |
| 100 l/h | 1 | 1/35 |
| 250 l/h | 1 | 1/12 |

The layer which detached itself from the plates had a character similar to that of the embodiment of Example 3.

Cleaning means include ultra-sound means for removing the solid surface layer on the plate means 3 while portions thereof successively pass through the container formed by the lower portion of the housing 1.

It is, of course, to be understood that the present invention is, by no means, limited to the specific showing in the drawings and to the specific examples set forth in the specification, but also comprises any modifications within the scope of the appended claims.

What I claim is:

1. An apparatus for purifying gases, especially industrial waste gases, which includes: a liquid as an aqueous solution to form a layer to absorb impurifications and harmful substances from the gas to be purified, housing means including a gas inlet and a gas outlet and a container having the liquid therein at a level below said gas inlet and said gas outlet, rotatable driven pipe means and a plurality of annular rotatable plate means coaxially mounted on said pipe means for rotation therewith, said plate means being axially spaced from each other by a few millimeters and the pipe means being rotatably journalled in the housing means so that said plate means are immersed partially in such liquid and, when the pipe means and plate means rotate, a layer of liquid is formed on said plate means above the level of said liquid, and means connected to and in contact with said pipe means to evaporate the liquid on said plates to form a solid surface layer capable of adsorbing and chemically reacting with impurifications and harmful substances from the gas to be purified, and means for removing impurifications and harmful substances adsorbed from the gas and chemically fixed by said solid surface layer from said annular plate means, said pipe means protruding from said container, and comb-shaped strip means arranged substantially parallel to said pipe means and connected to the inner wall of said housing means, said strip means being arranged above the level of said liquid in said container and on opposite sides of said pipe means and extending between said plate means into the space defined by the inner periphery of said housing means and the outer periphery of said pipe means.

2. An apparatus according to claim 1, in which the diameter of said pipe means exceeds one third of the outer diameter of said annular plate means.

3. An apparatus according to claim 1, in which said plate means are provided with metal wire containing felt layers for enlarging the surface of said plate means.

4. An apparatus according to claim 1, which includes liquid inlet and outlet means associated with said housing means, said inlet means being arranged in that area of said housing means where the freshly wetted plates emerge from said container, and said outlet means being arranged in that area of said housing means which is located opposite said inlet means.

5. An apparatus according to claim 1, which includes cleaning means arranged within said container for engagement with said plate means while its portions pass through said liquid for cleaning said portions.

6. An apparatus according to claim 5, in which said cleaning means include ultra-sound means for removing the solid surface layer on said plate means while its portions successively pass through said container.

7. An apparatus for purifying gases, especially industrial waste gases, which includes in combination: a liquid as an aqueous solution to form a layer to absorb impurifications and harmful substances from the gas to be purified, housing means including a gas inlet and a gas outlet and a container having the liquid therein at a level below said gas inlet and said gas outlet, rotatable driven pipe means and a plurality of annular rotatable plate means coaxially mounted on said pipe means for rotation therewith, said plate means being axially spaced from each other by a few millimeters and the pipe means being rotatably journalled in the housing means so that said plate means are immersed only partially in such liquid and, when the pipe means and plate means rotate, a layer of liquid is formed on said plate means above the level of said liquid, and means connected to and in contact with said pipe means to evaporate the liquid on said plates to form a solid surface layer capable of adsorbing and chemically reacting with impurifications and harmful substances from the gas to be purified, and means in said liquid for removing impurifications and harmful substances adsorbed from the gas and chemically fixed by said solid surface layer from said annular plate means.

8. An apparatus according to claim 7, in which within said pipe means a heater or cooler is arranged.

9. An apparatus for purifying gases, especially industrial waste gases, which includes in combination: a liquid as an aqueous solution to form a layer to absorb impurifications and harmful substances from the gas to be purified, housing means including a gas inlet and a gas outlet and a container having the liquid therein at a level below said gas inlet and said gas outlet, rotatable driven pipe means and a plurality of annular rotatable plate means coaxially mounted on said pipe means for rotation therewith, said plate means being axially spaced and the pipe means being rotatably journalled in the housing means so that said plate means are immersed only partially in such liquid and, when the pipe means and plate means rotate, a layer of liquid is formed on said plate means above the level of said liquid, and means connected to and in contact with said pipe means to evaporate the liquid on said plates to form a solid surface layer capable of adsorbing and chemically reacting with impurifications and harmful substances from the gas to be purified, means fixed to said container above the level of said liquid and extending over said liquid to separate said liquid from the gas flowing between said plates, and means in said liquid for removing impurifications and harmful substances adsorbed from the gas and chemically fixed by said solid surface layer from said annular plate means.

* * * * *